United States Patent
Berger et al.

(10) Patent No.: US 6,168,083 B1
(45) Date of Patent: Jan. 2, 2001

(54) CHIP-CARD WITH MODE SWITCHING BETWEEN CONTACTLESS AND CONTACT-COUPLED MODE

(75) Inventors: Dominik Berger; Wolfgang Eber; Gerald Holweg, all of Graz (AT)

(73) Assignee: U.S. Philips Corporation, New York, NY (US)

( * ) Notice: Under 35 U.S.C. 154(b), the term of this patent shall be extended for 0 days.

(21) Appl. No.: 08/776,739

(22) PCT Filed: Dec. 5, 1996

(86) PCT No.: PCT/IB96/00518

§ 371 Date: Feb. 27, 1998

§ 102(e) Date: Feb. 27, 1998

(87) PCT Pub. No.: WO96/38814

PCT Pub. Date: Dec. 5, 1996

(30) Foreign Application Priority Data

Jun. 2, 1995 (AT) .......................................... 947/95

(51) Int. Cl.⁷ .................................................. G06K 19/06
(52) U.S. Cl. ............................................. 235/492; 235/439
(58) Field of Search .................................... 235/492, 382, 235/380, 382.5, 487, 439, 379, 488, 441, 436; 902/4, 26, 25

(56) References Cited

U.S. PATENT DOCUMENTS 5,206,495 * 4/1993 Kreft .
5,929,414 * 7/1999 Saitoh .

FOREIGN PATENT DOCUMENTS

3935364C1 * 8/1990 (DE) .
2245729A * 1/1992 (GB) .

* cited by examiner

*Primary Examiner*—Michael G Lee

(57) ABSTRACT

A chip card is operable in a contactless and contact-coupled mode. For operation in the contactless mode, the chip card has an antenna coil and rectifier. In the contactless mode, the chip card receives an AC signal. The rectifier provides a rectified received AC signal. The rectified signal is used for powering internal circuitry of the chip card. The chip card further has a recognition circuit that recognizes whether an AC signal is actually received by the antenna coil. If the AC signal is recognized, the recognition circuit switches the chip card to the contactless mode. If no AC signal is recognized, the recognition circuit switches the chip card to the contact-coupled mode.

12 Claims, 3 Drawing Sheets

CHIP-CARD WITH MODE SWITCHING BETWEEN CONTACTLESS AND CONTACT-COUPLED MODE

BACKGROUND OF THE INVENTION

1. Field of the Invention

The present invention relates to a chip-card which can be coupled to an associated write-read station via contacts as well as via at least one antenna coil, the write-read station supplying the operating power for the chip-card via the coupling and the data exchange also taking place via this coupling, a rectifier being provided to supply power in the case of coupling via the antenna coil(s).

2. Description of the Related Art

A chip-card of this kind is known from DE-C-39 35 364. Chip-cards are highly integrated electronic units (chips) packed in a synthetic material with the format of a credit card. Depending on the relevant field of application, there are nowadays, for example electronic travel tickets, GSH cards, telephone cards and many others. In conformity with the field of application, the electronic units deviate from one another notably in respect of parameters such as storage capacity, access protection, data transmission rate, flexibility and transmission distance for contactless chip-cards.

Most chip-cards have a contact bank for the contact-coupled mode of operation. Lately, however, increasing numbers of contactless cards are used which feature notably a higher reliability, easier handling and better protection against vandalism for the associated contactless write-read stations. In the contactless mode, the transfer of power and clock signals to the electronic circuitry of the card, or the bidirectional data transmission, is realized via inductive coupling between the antenna of the write-read station and the antenna coil of the chip-card. The supply voltage for the chip-card is formed by rectification of an RP signal transmitted by the write-read station. In the contact-coupled mode of operation, the supply voltage, clock signals and data are conducted via separate contacts.

DE-C-39 35 364 already discloses a chip-card which can operate via contacts as well as via inductive coupling. The modes of operation can be activated at option and with full equality by using either a contactless or a contact-coupled write-read station.

According to DE-C-39 35 364 for this purpose there is provided a multiplexer which receives on the one hand the signals from the contacts of a contact bank and on the other hand the appropriately prepared signals from the coils (supply voltage, clock signals, data). A circuit of the type also provided in chip-cards constructed exclusively for operation in the contact-coupled mode is connected to the outputs of the multiplexer (for example, an arithmetic circuit and a storage unit). In order to define which signals are switched to the outputs by the multiplexer (the signals present on the contacts of the contact bank or the appropriately prepared signals received from the coils), there is provided a comparator which compares the DC voltage derived from the RF signal received from the coils with the DC voltage present on the contact bank.

It is a drawback of this circuit that the operating voltage is also conducted via the multiplexer in which inevitably a given voltage drop occurs. Therefore, the operation of this circuit will be poor in the fringe range (in the case of a large distance between the write-read station and the chip-card).

SUMMARY OF THE INVENTION

It is an object of the presert invention to provide a chip-card of the kind set forth in which the range in the contactless mode is equal to or only insignificantly shorter than in chip-cards which are suitable exclusively for contactless operation.

According to the invention, this object is achieved by means of a chip-card of the kind set forth in that the rectifier is connected directly to components requiring operating voltage, and that there is provided an AC recognition circuit for switching the chip-card between the two modes of operation "coupling via the contacts" and "coupling via the antenna coil(s)".

Thus, the voltage generated in the rectifier is applied directly to the components requiring operating voltage, so that this full voltage is available as in the case of chip-cards which are suitable exclusively for the contactless mode of operation. Therefore, ignoring a slightly higher power consumption, the range is approximately the same as in chip-cards constructed exclusively for the contactless mode.

Due to this step, however, a mode-switching circuit of the kind provided in DE-C-39 35 364 is not possible; because the rectifier is connected directly to the components requiring operating voltage, it always carries a voltage, irrespective of whether it is supplied by the rectifier itself or by a contact of the contact bank. (This is not the case in the circuit known from DE-C-39 35 364, because the supply voltage is applied to the components requiring operating voltage via the multiplexer.) Therefore, according to the invention there is provided an AC recognition circuit (for example, in the form of an additional rectifier) for switching between the modes of operation. If this circuit recognizes an AC voltage on the antenna coil, the chip-card is switched to the contactless mode of operation ("coupling via the antenna coil (s)") and otherwise to the contactcoupled mode of operation ("coupling via the contacts").

As an alternative for the AC recognition circuit the contact supplying the supply voltage may be decoupled from the rectifier, for example by means of a diode, and a voltage recognition circuit may be connected to this contact in order to switch the chip-card between the two modes of operation "coupling via the contacts" and "coupling via the antenna coil(s)". When this circuit detects a voltage on the contact, the chip-card is switched to the contact-coupled mode of operation ("coupling via the contacts") and otherwise to the contactless mode of operation ("coupling via the antenna coil (s)").

Thus, in the first case the mode of operation is governed by whether or not an AC voltaga is induced into the antenna coil whereas in the latter case it is governed by whether or not a DC voltage is present on the relevant contact. A combination of the two possibilities is also feasible.

Preferably, not more than one antenna coil is provided. A chip-card which is designed exclusively for contactless operation and does not require more than one antenna coil is described in AT-B-395 224. If the transmission system disclosed therein is used in the context of the present invention, the circuit will feature the minimum number of electronic components, being only one coil, one chip and one contact bank, and will also have interface switching which can be simply implemented from an integration point of view.

Preferably, the memory access authorizations can be configured differently in dependence on the modes of operation "coupling via the contacts" and "coupling via the antenna coil(s)". There may notably be provided two memory sections which are alternatively activated in dependence on the modes of operation "coupling via the contacts" and "coupling via the antenna coil(s)". Thus, one and the same card can perform two completely different functions in dependence on the mode of operation in which it is used (for example, electronic travel ticket in the contactless mode and telephone card in the contact-coupled mode).

In the mode "coupling via the antenna coil(s)" the circuit components which are not required in this mode are very advantageously controlled to a power-saving rest state in order to achieve a maximum transmission range. The range then equals that of a chip-card designed exclusively for the contactless mode.

When the chip is mounted on the underside of the contact bank and is connected, via two terminals, to a wound, etched or printed antenna coil embedded in the chip-card, a very large antenna coil can be used; this is beneficial for the range. A chip-card can be particularly simply manufactured, however, if the antenna coil is integrated with the chip. In that case it is again effective to mount the chip with integrated antenna underneath the contact bank. A compromise between simplicity of manufacture and size of the antenna coil consists in that the chip is mounted on the underside of the contact bank and is connected, via two terminals, to a small antenna winding which, like the chip, is also situated, underneath the contact bank in the contact module.

BRIEF DESCRIPTION OF THE DRAWING

The invention will be described in detail hereinafter with reference to the accompanying drawings. Therein.

DETAILED DESCRIPTION OF THE INVENTION

Figure 1:
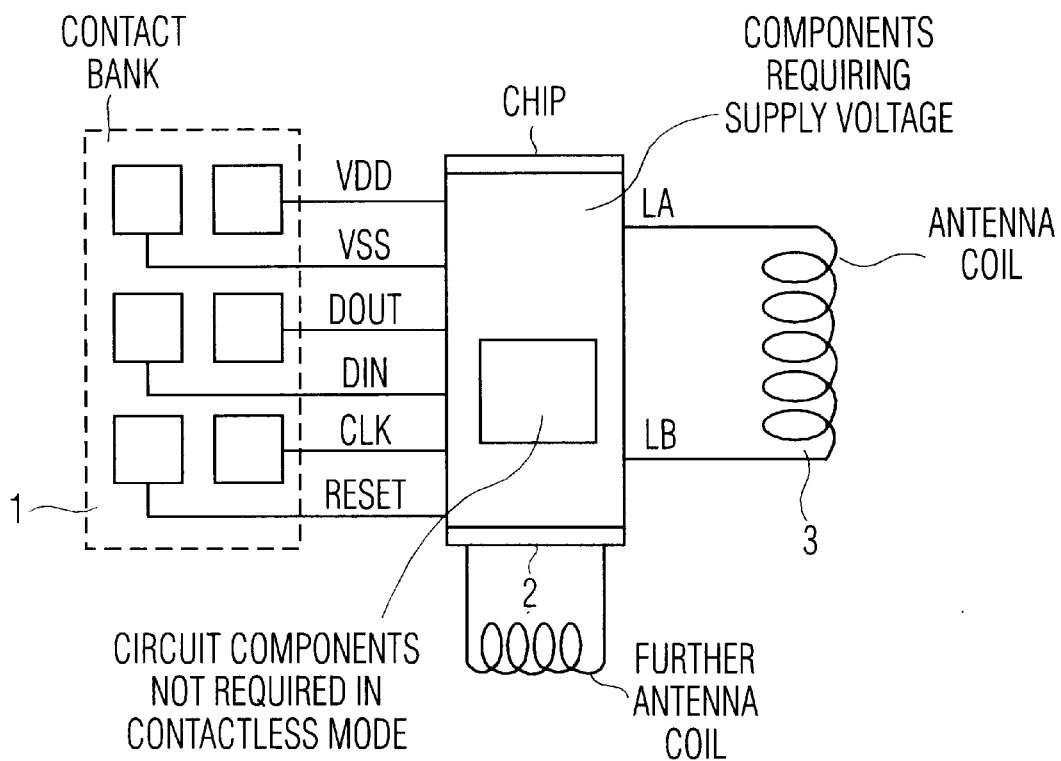
FIG. 1 is a diagrammatic representation of the electric circuit with a minimum number of individual components.
Figure 2:
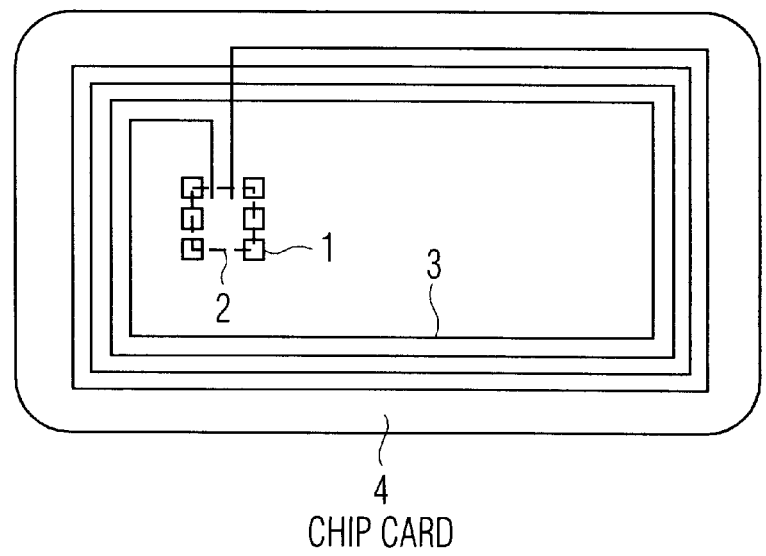
FIG. 2 shows a feasible encapsulation of this circuit in a plastic card.

As appears from FIG. 1, a monolithically integrated circuit or chip 2 includes terminals LA, LB for an antenna coil 3 and terminals VDD, VSS, DOUT, DIN, CLK, RESET for a contact bank 1. (The supply voltage is present between VDD and VSS; data is transmitted to the write-read station via DOUT; data is transmitted to the chip-card via DIN; a clock signal is transmitted to the chip-card via CLK; a reset signal is applied thereto via RESET.) As is shown in FIG. 2, the chip 2 is mounted on the underside of the contact bank 1 as is customary in cards designed exclusively for the contact-coupled mode. An antenna coil 3, consisting of a few turns, is embedded in the chip-card 4 and is wound, etched or printed as desired. Therefore, pure contact-coupled card technology can be simply expanded to contactless operation, if an appropriate chip is used, by additionally connecting the chip 2, provided underneath the contact bank 1, via two terminals, to an antenna coil 3 embedded in the chip-card 4. The chip 2 comprises components requiring supply voltage, and circuit components not required in contactless mode of operation of the chip-card. A further antenna coil may be coupled to the chip.

For a given card format the embodiment shown in FIG. 2 offers a maximum range in the contactless Lode because the antenna coil 3 is now placed so that the winding surface area is maximum.

However, other antenna arrangements are also feasible in the context of the present invention so that, for example one and the same card can satisfy the international standards for contact-coupled cards (ISO 7816) as well as for contactless cards (ISO 10536). Furthermore, the possibility of combination with magnetic strips is completely maintained.

The function of the chip 2 will now be described with reference to FIG. 3. In the contactless mode power, clock signals and data are received and data is transmitted via LA and LB. A transmission method which is suitable for this purpose is disclosed in AT-B-395 224. The RF signal received is rectified in a rectifier 5, smoothed by a capacitor 7 and limited by a parallel regulator 6 (being a zener diode in the simplest case). The clock signals for the chip circuit are derived from the AC voltage in a clock signal preparation circuit 8. The data received is prepared in a demodulation stage 9 and a modulation stage 10 returns data. A level recognition circuit 11 indicates the surpassing of the minimum operating voltage required. In order to implement contactless and contact-coupled interfaces on the same chip 2, automatic recognition of the mode of operation is required for activation of the correct interface. This is realized by means of an AC recognition circuit 12 which activates the contactless interface if an AC voltage is present on the antenna coil 3 and otherwise the contact-coupled interface. A control unit 13 controls either the contactless or the contact-coupled interface in dependence on the mode of operation, and controls the access to a data memory 14 via a unidirectional address bus and a bidirectional data bus. The data memory 14 comprises a first and a second memory section.

The control unit 13 consists of four sections: section 13a comprises the circuits which recognize whether the chip-card is in operation (this is determined by the level recognition circuit 11) and, if so, which interface is active. Section 13b comprises the circuits which activate the contactless interface, and section 13c comprises the circuits which activate the contact-coupled interface. Finally, section 13d comprises the circuits required for both modes of operation (therein, for example the data are fetched from the data memory 14). In order to minimize the power consumption (important notably in the contactless mode in order to achieve a large range), either the section 13b or the section 13c is set to a power-saving rest state in dependence on the mode of operation.

The control unit 13 can be implemented in a variety of ways in conformity with the relevant application:

a wide variety of protocols and baud rates for contactless and/or contact-coupled interfaces cryptography, authentification, PIN memory access protection with separate memory access sections, via contactless or contact-coupled interface in dependence on the mode of operation, implementation by means of microprocessor or logic gates, reduction of power consumption by de-activation of components which are not required in the contactless mode of operation, anti-collision procedure for contactless mode of operation of a plurality of cards at the operating distance from a write-read station etc.

In conformity with the foregoing description a chip-card can be realized with a minimum number of individual components and hence with a minimum work effort; such a chip-card can be operated via a contactless interface as well as via a contact-coupled interface, without loss of functionality or compatibility with the standards.

Figure 3:
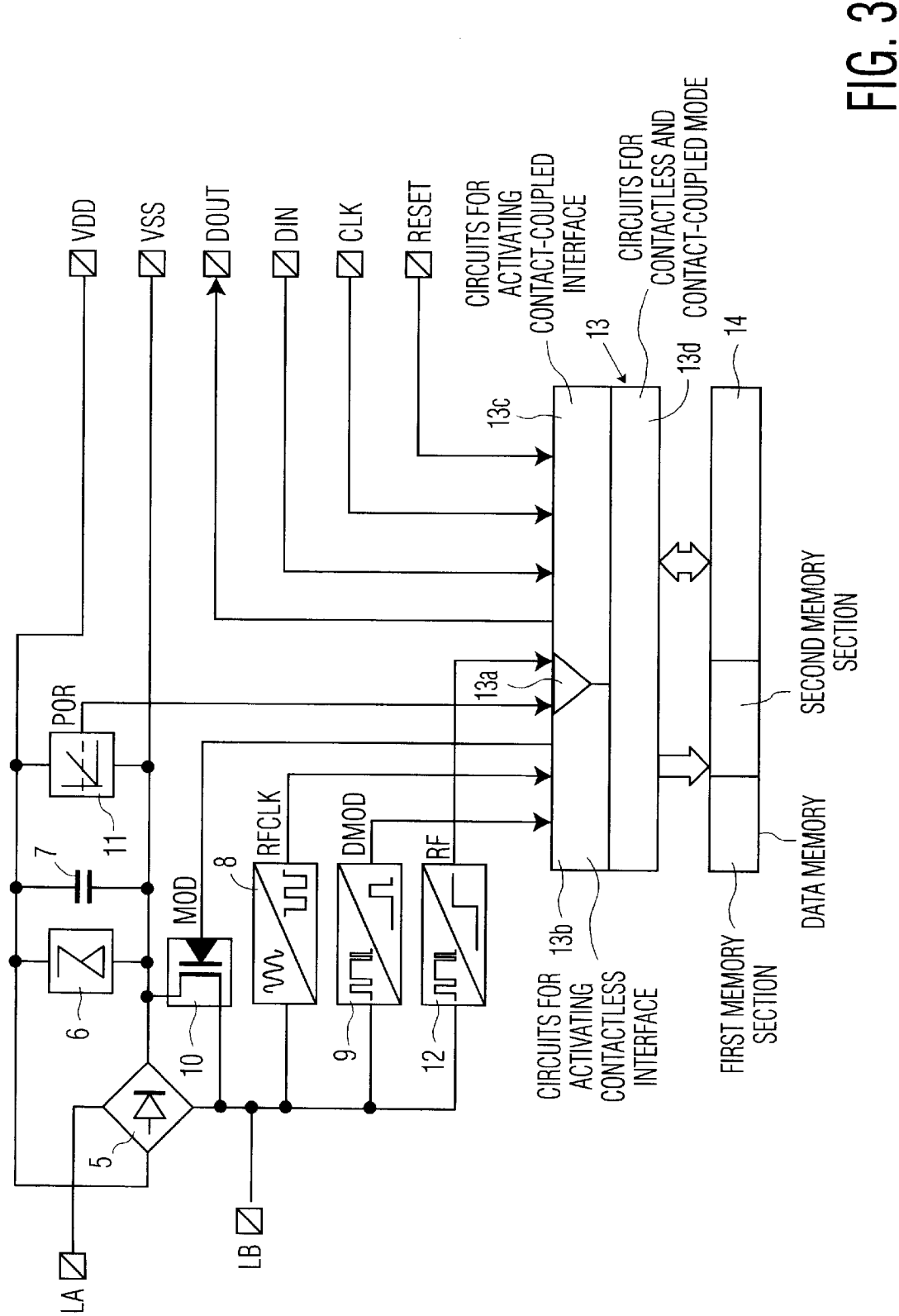
FIG. 3 shows the electric block diagram of the monolithically integratable circuit (chip)
Figure 4:
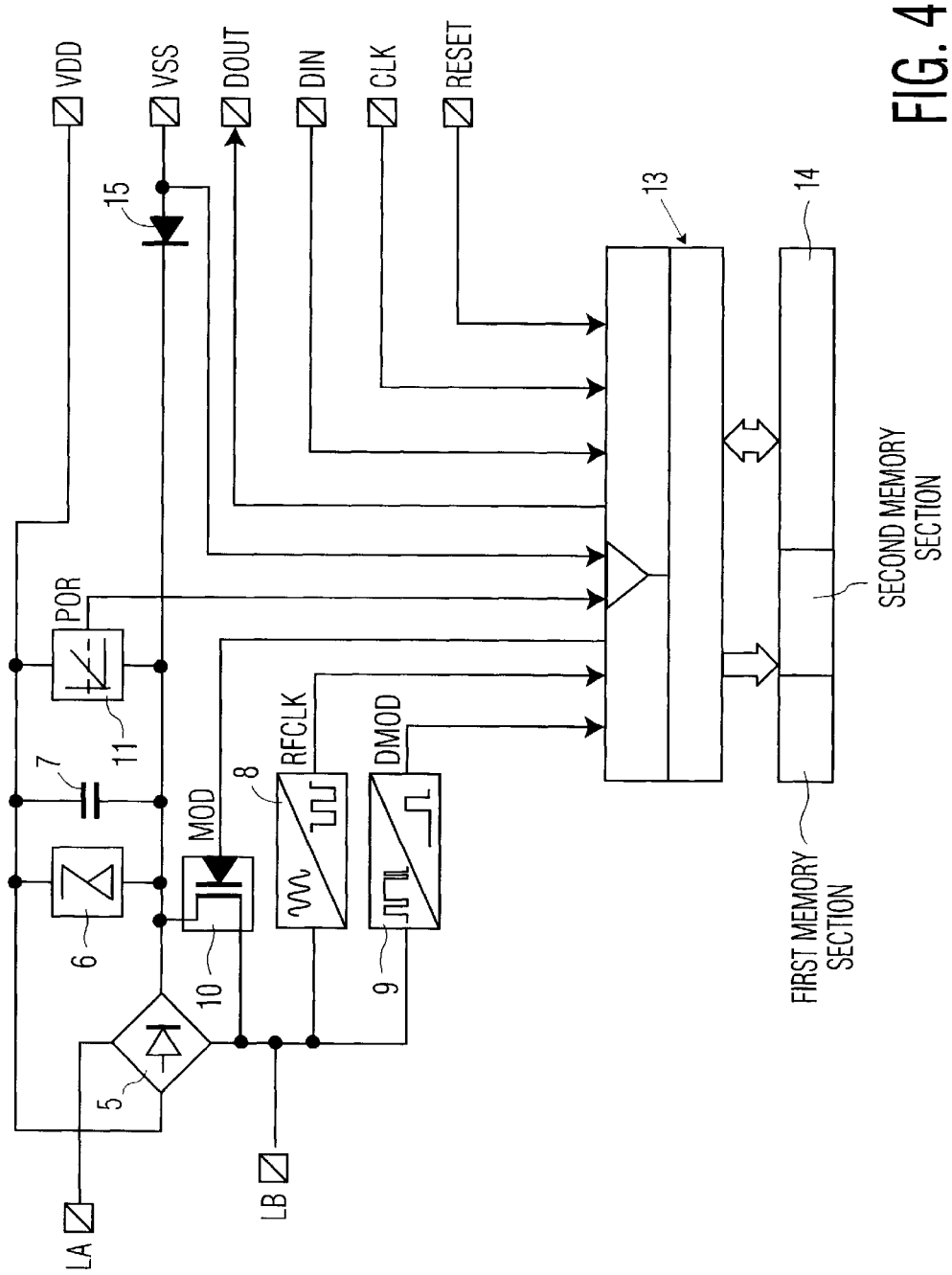
FIG. 4 shows a block diagram which is similar to that of FIG. 3 but relates to another embodiment.

FIG. 4 deviates from FIG. 3 in that the AC recognition circuit 12 is absent. Instead a diode 15 is connected between the terminal VSS and the rectifier 5, which diode decouples the terminal VSS from the rectifier 5. Therefore, the terminal VSS does not carry a voltage if the operating voltage is supplied by the antenna coil 3; a voltage is present thereon only if the operating voltage is supplied by the contact connected to the terminal VSS. The terminal VSS is connected directly to the control unit 13 so that the latter can recognize the mode of operation by means of a voltage recognition circuit.

What is claimed is:

1. A chip-card comprising:

components requiring a supply voltage;

a rectifier;

an antenna coil coupled to the rectifier;

a contact;

a control unit; and an AC recognition circuit for recognizing an AC-signal received by the antenna coil and for converting the recognized the received AC-signal to a DC control signal, the AC recognition circuit not being comprised in the components, the chip-card being operable in a contact-coupled mode of operation via the contact and a contactless mode of operation via the antenna coil, a write-read station supplying the supply voltage to the chip-card when coupled to the chip-card, in order to avoid voltage losses both the rectifier and the contact being directly connected to the components, and the DC control signal being provided to the control unit that controls the chip-card to switch between the contact-coupled and contactless modes of operation.

2. A chip-card comprising:

a memory;

a controller coupled to the memory;

an antenna coil via which the chip card operates in a contactless operating mode;

a contact used via which the chip-card operates in a contact-coupled operating mode; and switching means for switching the chip-card in the respective contact-coupled and contactless modes;

a write-read station supplying a supply voltage to the chip-card when coupled to the chip-card, and the controller being configured to control a first memory access authorization to the memory when the chip-card is in the contact-coupled mode, and a second memory access authorization to the memory when the chip card is in the contactless mode of operation.

3. A chip-card as claimed in claim 2, wherein the memory comprises a first memory section that is accessed in the contact-coupled mode and a second memory section that is accessed in the contactless mode.

4. A chip-card as claimed in claim 3, wherein the first and second memory sections are programmed to perform a first and a second function, respectively.

5. A chip-card comprising:

components requiring a supply voltage;

a rectifier;

an antenna coil coupled to the rectifier;

a contact;

a controller, a memory coupled to the controller, and an AC recognition circuit for recognizing an AC-signal received by the antenna coil, the chip-card being operable in a contact-coupled mode of operation via the contact and a contactless mode of operation via the antenna coil, a write-read station supplying the supply voltage to the chip-card when coupled to the chip-card, both the rectifier and the contact being directly connected to the components, the AC recognition circuit being configured to cause the chip-card to switch between the contact-coupled and contactless modes of operation, and the controller being configured to control a first memory access authorization to the memory when the chip card is in the contact-coupled mode, and a second memory access authorization to the memory when the chip card is in the contactless mode of operation.

6. A chip-card as claimed in claim 5, wherein the chip card comprises at least a further antenna coil.

7. A chip-card as claimed in claim 5, wherein the components, the rectifier, the AC-recognition circuit are comprised in a chip, the chip being mounted on beneath a contact bank that comprises the contact, and being connected, via terminals of the chip, the antenna coil being embedded in the chip-card.

8. A chip-card as claimed in claim 5, wherein the components, the rectifier, the AC-recognition circuit are comprised in a chip, and the antenna coil is integrated on the chip.

9. A chip-card as claimed in claim 8, the chip is mounted underneath a contact bank that comprises the contact.

10. A chip-card as claimed in claim 5, wherein the components, the rectifier, the AC-recognition circuit are comprised in a chip, and the antenna coil is comprised of an antenna winding that has a dimension that is small as compared to a dimension of the chip card, the antenna winding and the chip being mounted underneath a contact bank that comprises the contact.

11. A chip-card as claimed in claim 5, wherein the memory comprises a first memory section that is accessed in the contact-coupled mode and a second memory section that is accessed in the contactless mode.

12. A chip-card as claimed in claim 11, wherein the first and second memory sections are programmed to perform a first and a second function, respectively.

\* \* \* \* \*